United States Patent [19]

White

[11] Patent Number: 4,746,977
[45] Date of Patent: May 24, 1988

[54] REMOTELY OPERATED STEERABLE VEHICLE WITH IMPROVED ARRANGEMENT FOR REMOTE STEERING

[75] Inventor: John R. White, Oak Ridge, Tenn.

[73] Assignee: Remote Technology Corporation, Oak Ridge, Tenn.

[21] Appl. No.: 25,154

[22] Filed: Mar. 12, 1987

[51] Int. Cl.[4] ............................................. H04N 7/18
[52] U.S. Cl. .................................. 358/103; 358/100; 364/424; 180/168
[58] Field of Search ............... 358/103, 101, 108, 93; 180/167; 358/100; 180/168, 169; 364/424

[56] References Cited

U.S. PATENT DOCUMENTS

| | | | |
|---|---|---|---|
| 3,211,826 | 3/1965 | LaRussa | 358/103 X |
| 3,504,122 | 3/1970 | Ratliff, Jr. | 358/88 |
| 3,882,268 | 5/1975 | Ogawa et al. | 358/93 |
| 4,214,266 | 7/1980 | Myers | 358/103 X |
| 4,247,870 | 1/1981 | Gabel et al. | 358/93 |
| 4,533,998 | 8/1985 | Falamak | 180/168 X |
| 4,566,032 | 1/1986 | Hirooka | 358/103 |
| 4,630,109 | 12/1986 | Barton | 358/103 |

FOREIGN PATENT DOCUMENTS 2128842  5/1984  United Kingdom ................ 358/100

OTHER PUBLICATIONS

"Security Patrol Cart System"; IBM Disclosure Bulletin; vol. 23, #3, Aug. '80; Sirbola, p. 902.

Primary Examiner—Howard W. Britton
Assistant Examiner—Victor R. Kostak
Attorney, Agent, or Firm—Staas & Halsey

[57] ABSTRACT

A remotely operated steerable vehicle especially usable as a teleooperated mobile robot system is disclosed. The vehicle carries a videocamera which shows the field of view directly ahead. A remote control station has a videomonitor showing said field of view with left and right upwardly converging guidelines on the monitors screen representing the left and right edges of the area traversed by the vehicle if it moves straight into the field of view. The guidelines provide an excellent and inexpensive assistance to the operator who steers the vehicle from a remote location as the operator knows everything outside the guidelines will be missed and everything inside the guidelines will be impacted. The guidelines are further enhanced by traverse markers on the monitor screen representing fixed distances in front of the vehicle so as to provide a depth of field.

12 Claims, 2 Drawing Sheets

REMOTELY OPERATED STEERABLE VEHICLE WITH IMPROVED ARRANGEMENT FOR REMOTE STEERING

This invention relates to vehicles which are controlled from a remote location.

Steerable vehicles that are remotely operated permit the transport of sensing devices, the carrying of material and the carrying of manipulators such as robotic arms and grippers and so forth to locations that are too hostile, small, or inconvenient for human operators to go. Such vehicles can be transport bases for robots which can do work at a distant location both under the teleooperated control of a remote operator and in an automatic mode or a combination of the two. They can also serve to transport surveillance gear, sampling devices, work tools, armaments and other desired devices into nuclear power plants, environmentally hazardous areas of chemical process plants, battlefields, and similar locations. They can be used for automatic sentry and patrol duty switching over to remotely operated manual control in the event of unusual occurrences.

The vehicles of the type relating to the present invention carry one or more cameras such as videocameras to show where they are going. The picture from the camera is communicated back to a remote operator who controls the direction of movement of the vehicle so as to have it go to the proper destination while avoiding obstacles.

This remote operation is difficult to achieve in some circumstances such as a vehicle going down a narrow hall. Usually it will do some bouncing from wall to wall. Also, it is difficult to steer in close proximity to obstacles.

Others have tried to improve remote control by the use of mechanisms such as stereographic cameras to obtain a three-dimensional system so the remote operator will have the kind of depth perception a human would have when walking around and avoiding obstacles. Some require the use of special glasses which are heavy and not particularly comfortable. Some use a hooded type monitor system where the operator places his head in a precise position so the operator's eyes are located properly. These methods are inconvenient and still suffer from the problem that when the vehicle is close to an obstacle it goes out of the field of view and the operator does not know whether the obstacle will be missed or impacted. Also, these techniques are expensive. These other mechanisms do serve to give the operator more depth perception and the ability to make better judgments in directing the vehicle.

The present invention provides an inexpensive means by which an operator's ability to steer a remote vehicle, especially around obstacles, is greatly enhanced. The type of remote vehicle utilized is one that has a videocamera on the vehicle and a monitor at the operator's control console at a remote station. The present invention may be as simple as the use of an ordinary black and white camera and monitor with the camera pointed in the vehicle's direction of motion and the monitor having a set of guidelines that tell the operator where the perimeter of the vehicle is going to pass within the field of view of the camera.

The following advantages and function of the invention will be more fully understood from the following detailed description with reference to the acompanying drawings wherein.

The present invention is especially useful with the Remotely Controlled and/or Powered Mobile Robot With Cable Management Arrangement of commonly owned and pending U.S. patent application Ser. No. 776,012, filed Apr. 22, 1986 which is incorporated into this disclosure by reference. Similarly, reference is made to pages 163 to 168 of the *Proceedings, 33rd Conference on Remote Systems Technology*, 1985 for the article entitled "Surveillance Robot for Nuclear Power Plans" presented at the November 1985 Winter Meeting of the American Nuclear Society. This surveillance robot under the trademark SURBOT is shown in FIG. 1 and is commercially available from Remote Technology Corporation, 114 Union Valley Rd., Knoxville, Tenn. 37830, U.S.A.

Figure 1:
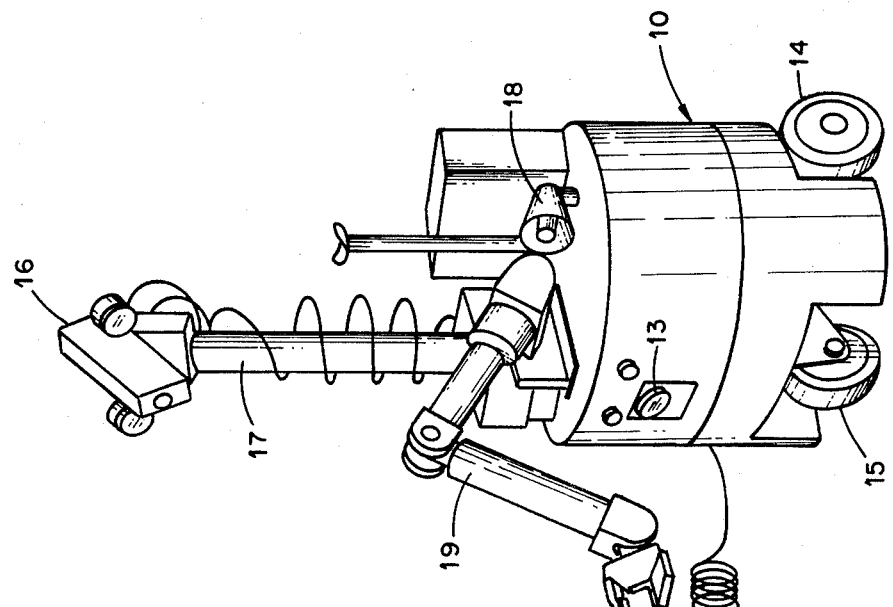
FIG. 1 shows a perspective view of the remotely operated steerable vehicle linked to a remote station used with the present invention.
Figure 1:
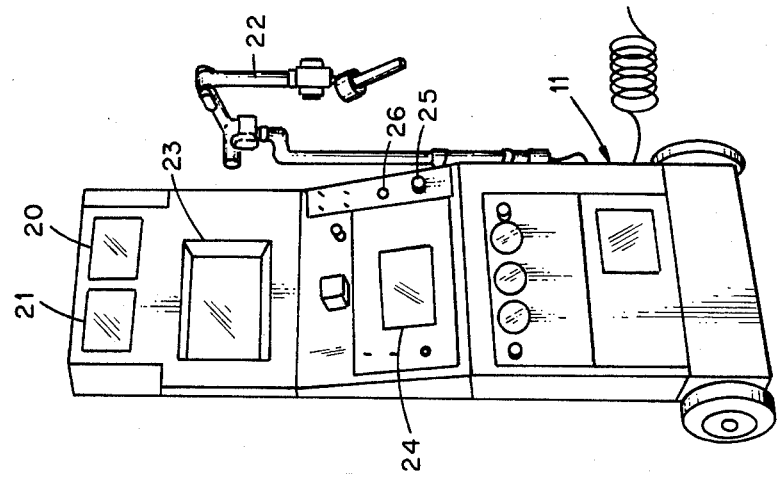

With reference to FIG. 1, there is shown a remotely operated steerable vehicle or robot transporter 10 connected by a cable 12 to a remote station 11.

The vehicle 10 has a propulsion system consisting of two independently driven wheels 14 and a swivel or caster wheel 15. The vehicle is steered and maneuvered by varying the difference in speed between the two drive or steering wheels 14. The vehicle has a front camera 13, preferably a videocamera, with a field of view directly in front of the vehicle. Preferably, because of cost, the videocamera 13 is black and white but may be in color. A similar videocamera 29, shown as FIG. 2, has a field of view directly to the rear of the vehicle.

The vehicle 10 shown in FIG. 1 is equipped for use as a nuclear power plant surveillance robot and has a surveillance camera and microphone 16, carried by an extensible tower 17. The robot also has a speaker 18 and robot arm 19. For other applications, the vehicle would have other equipment mounted thereon as required by the use.

The cable 12 carries battery charging power, video signals and control signals over wire. Alternatives may be used. For example, the batteries or other power in the vehicle may not need to be charged and the video control and other signals can be communicated by optical fiber, microwave or other wireless means.

Figure 3:
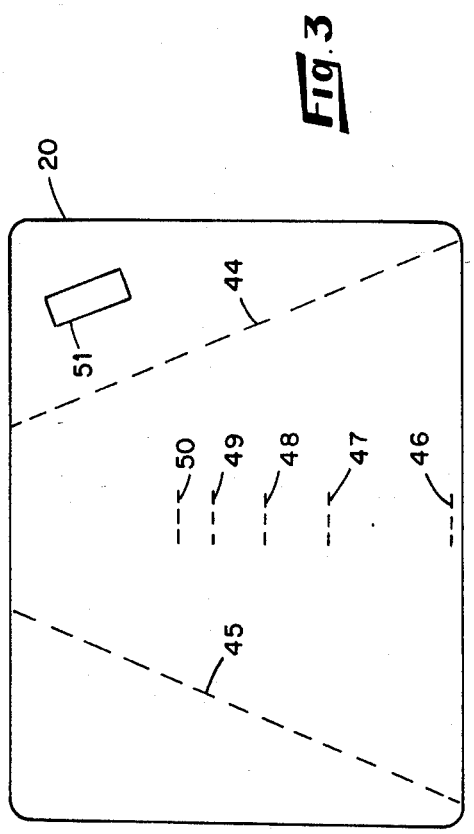
FIG. 3 shows the monitor screen of the videomonitor located at the remote control station.

The remote station or control console has a screen or videomonitor 20 showing the front field of view of videocamera 13. The screen or videomonitor 21 shows the rear field of view of videocamera 29. Neither videomonitor 20 or 21 in FIG. 1, because of scale, show the guidelines 44 and 45 or depth markers or lines 46 to 50 which are shown in FIG. 3. Videomonitor 23 shows the field of view of surveillance camera 16. Adjacent to the control console 11 is master robot arm 22 to operate remotely the robot arm 19.

The control console 11 also has a computer display screen 24; a surveillance camera control 26 and a joystick 25 for steering direction and speed control of vehicle 10.

The joystick 25 is commonly available as an analog control that feeds into analog to digital parts in the control console's computer. The stick is spring loaded so when it is released it returns to a center position.

When the stick is moved forward the vehicle goes forward and when the stick is moved rearward the vehicle goes backward. When the stick is moved to the right the vehicle pivots to the right and when moved to the left the vehicle pivots to the left. The further the stick is moved forward or reverse the greater the speed of the vehicle. It is all logical and quickly learned.

Figure 2:
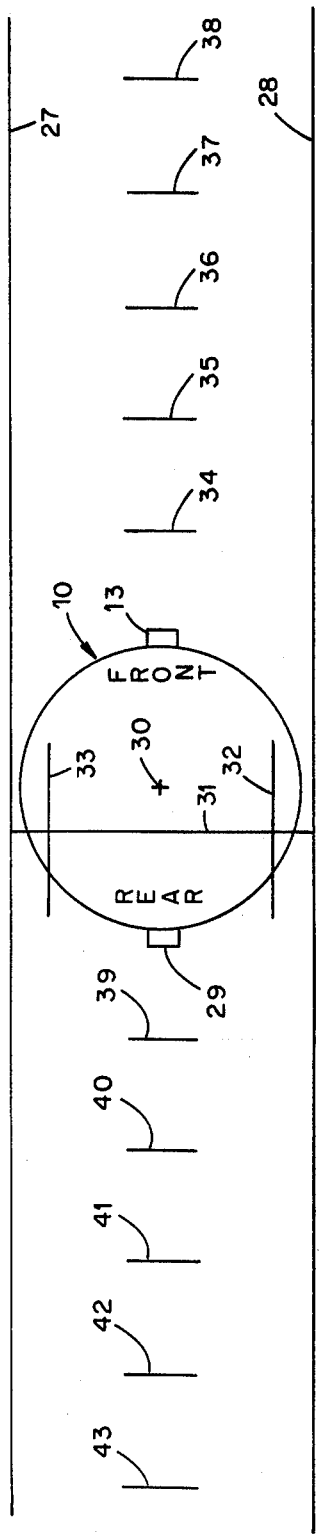
FIG. 2 shows a plan view of a schematic of the remotely operated steerable vehicle on a calibrated floor template.

With reference to FIG. 2 therein is shown a plan view of vehicle 10 on a calibration template. The calibration template is made up of black lines laid on the floor and in this case they are black tape placed on the floor. Two of the lines are parallel and represent the left guideline 27 and the right guideline 28. In this case the vehicle is 30 inches wide so the lines are spaced apart 31 inches which is just slightly greater than the maximum width of the vehicle. Thus, if the vehicle 10 is driven straight ahead, it will pass or traverse an area between the two lines without overlapping them. The lines are approximately 15 feet long and the extra ½ inch clearance on each side of the vehicle provided by the spacing accommodates slight shifts in the electronics and other variations. With other vehicles and situations, the amount of clearance could change.

The schematic of the vehicle 10 shown in FIG. 2 has a center 30 and a geometric axis line 31 for the drive wheels 14 which are represented by line 32 for the right drive wheel and line 33 for the left drive wheel. This center and these lines are also part of the calibration template. It is to be noted that the right and left drive wheels 14 are on independent axles even though they are on the same geometric axis. The front of the vehicle has front or forward looking videocamera 13 and the rear has rear or reverse looking videocamera 29.

In order to show depth of field, the calibration template has a series of transverse lines spaced one foot apart starting one foot in the front and one foot in the rear of the vehicle. These are shown as depth lines 34, 35, 36, 37 and 38 spaced, respectively, one foot, two feet, three feet, four feet and five feet to the front of the vehicle. Likewise, the depth lines to the rear or reverse are 39, 40, 41, 42 and 43, respectively, spaced one, two, three, four and five feet to the rear of the vehicle.

In FIG. 3 is shown the screen of the videomonitor 20. The field of view of the actual scene viewed by videocamera 13 is shown including an obstacle 51. Mounted on or attached to the screen is left guideline 45 and right guideline 44. These two guidelines are physically marked on the screen of the videomonitor to coincide exactly with the left guideline 27 and right guideline 28 of the calibration template of FIG. 2.

Likewise, mounted on or attached to the screen are lines physically marked on the screen to show depth of field. These are transverse lines or markers 46, 47, 48, 49 and 50 which, respectively, show one foot, two feet, three feet, four feet and five feet in front of the vehicle and are marked to exactly coincide, respectively, with transverse lines 34, 35, 36, 37 and 38 of the template of FIG. 2.

When reverse or rear screen videomonitor 21 is used, it would be like FIG. 3 except the left guideline 45 and the right guideline 44 coincides, respectively, with calibration template right guideline 28 and left guideline 27 since the videocamera is looking in a reverse direction. The depth of field indicators when looking at the field of view of the rear videocamera would have tranverse depth lines 46, 47, 48, 49 and 50 which coincide exactly with reverse depth lines, respectively, 39, 40, 41, 42 and 43.

The transverse depth line 46 of FIG. 3 is at the bottom of the screen since the first eleven inches in the front or rear of the vehicle in the specific embodiment described are outside the field of view of video cameras 13 and 29. The top of the field of view in the specific embodiment shown is approximately 10 feet to the front or rear of the vehicle.

It is to be noted that although the left and right guidelines 44 and 45 and the depth of field short transverse lines are physically marked onto the screen of the videomonitor such as by narrow tape or point, they can be indicated by other means. For example, they could be superimposed electronically through software or otherwise onto the field of view seen by the videocameras 13 and 29. Thus, if videocameras 13 and 29, instead of having a fixed field of view, are zoomed or rotated, then the lines representing the left guideline and right guideline and scene of field could change with the screen viewed by the camera so as to still represent the pathway and depth of field of the vehicle if it moved straight ahead or straight to the rear.

The guidelines 44 and 45 and depth of field lines 46, 47, 48, 49 and 50 are marked on the camera monitors 20 and 21 by driving the vehicle over the template of FIG. 2 so that the axles of wheels 14 have their axis over axis 31 and the center of the wheels over left and right wheel lines 33 and 32. These lines help align the vehicle anglewise with respect to left and right guidelines 27 and 28 which is important since the vehicle must be aligned very accurately to point straight ahead.

Then the guidelines 44 and 45 and depth of field lines 46 to 50 are marked on the screens of videomonitors 20 and 21 to exactly coincide and match the template guidelines 27 and 28 and template depth lines 34 to 43 as those template lines are viewed in the videomonitors.

While one videomonitor could be used to do the work of the two videomonitors 20 and 21, it is found more convenient to use two monitors.

The system described utilizes a vehicle with an umbilical cord or tether represented by cable 12. If the vehicle was wireless with no tether, or the return of the cable to the vehicle when it is reversed is not a consideration, then a single forward looking video camera 13 and videomonitor 20 would be sufficient without the rear videocamera 29 and rear videomonitor 21. The reason the rearward videocamera and videomonitor is provided is because the best way to reverse the direction of a tethered vehicle is to drive it in reverse and pick up the cable by rewinding so that it will not be dragged under obstacles and otherwise be snagged or provide resistance to movement.

As the vehicle is driven around all the operator has to do is look for objects that fall between the upwardly converging guidelines or pathlines 44 and 45. If the vehicle continues to proceed in the same direction, it will hit an obstacle located between the guidelines, but if the vehicle is steered in a direction to place those obstacles outside of the pathline, the obstacles will be avoided and the vehicle will maneuver around without bumping into various objects or obstacles. For example, obstacle 51 depicted in the field of view of FIG. 3 will be missed if the vehicle moves in a straight direction since it falls to the right of right guideline 44 and is thus outside the pathway that will be traversed by the vehicle.

In order to practice the invention, the vehicle should have a control and propulsion system which is accurate enough to allow the vehicle to go straight without any substantial deviation from a straight path. This will accommodate situations such as going through a doorway. The doorway is first seen including the sides of the doorway. However, as the vehicle approaches the door, the sides of the door disappear and fall out of the field of view of the camera. The operator must first line up on the doorway making certain the sides of the door are outside the guidelines. The vehicle can then be driven forward in a straight path and go through the doorway without touching either side.

Thus, the invention provides an arrangement that enhances the remote control of a vehicle, especially in locations where close maneuvering down narrow halls, through narrow doorways and around delicate equipment is involved, in an inexpensive and easily useable manner.

While a preferred embodiment of the invention has been shown and described, it will be understood that there is no intent to limit the invention by such disclosure, but rather it is intended to cover all modifications and alternate constructions falling within the spirit and scope of the invention as defined in the appended claims.

What is claimed:

1. A remotely operated steerable vehicle comprising:
   a vehicle for traversing a surface;
   a propulsion system for propelling said vehicle along a surface carried by said vehicle;
   a camera carried by said vehicle showing the field of view of the direction in which the vehicle is to travel;
   a remote station separated from said vehicle;
   a control system at said remote station for directing the movements of said vehicle;
   a viewing screen at said remote station representing said field of view as seen by said camera; and
   a left guideline and a right guideline on said screen which converge upwardly toward one another representing the outermost boundaries of the approximate width of the area traversed by said vehicle if it moves in a straight line directly forward in the direction of said field of view.

2. The remotely operated steerable vehicle of claim 1, wherein said camera is a forward looking video camera showing a forward field of view and said screen is a video monitor showing said forward field of view when said vehicle is traveling in a forward direction.

3. The remotely operated steerable vehicle of claim 2, wherein said vehicle has a reverse looking video camera which shows the reverse field of view of said vehicle if it moves straight to the rear of its normal forward direction of travel.

4. The remotely operated steerable vehicle of claim 3, wherein said vehicle has a reverse looking videomonitor located at said remote station which represents said reverse field of view of said reverse looking video camera.

5. The remotely operated steerable vehicle of claim 4, wherein both said video monitor showing said forward view and said reverse looking second videomonitor further comprises:
   a set of left and right upwardly converging guidelines on each of said screens with the space between one set of said guidelines representing the area traversed by the width of said vehicle if it moves straight ahead into the field of view of said video monitor showing said forward view and the space between the other set of guidelines representing the area traversed by the width of said vehicle if it moves straight to the rear into the field of view of said reverse looking monitor.

6. The remotely operated steerable vehicle of claim 1, wherein said left guideline and said right guideline are physical lines attached to said viewing screen.

7. The remotely operated steerable vehicle of claim 5, wherein said left and right guidelines are physical lines attached to the outside of said videomonitor.

8. The remotely operated steerable vehicle of claim 1, wherein a robotic manipulator is carried by said vehicle which is controllable from said remote station.

9. The remotely operated steerable vehicle of claim 5, wherein a robotic manipulator is carried by said vehicle which is controllable from said remote station.

10. The remotely operated steerable vehicle of claim 1, wherein depth of field indicators are on said screen to represent fixed distances in front of said vehicle.

11. The remotely operated steerable vehicle of claim 10, wherein said depth of field indicators are short transversal physical lines attached to said viewing screen.

12. A process for defining to an operator the pathway to be traversed over a surface by a remotely operated steerable vehicle having a video camera on the vehicle showing the field of view of the vehicle if it moves straight ahead and a videomonitor showing said field of view utilized by an operator in remotely steering the vehicle comprising the steps of:
   providing a template with an extended left line and extended right line which are parallel to one another and separated by a distance slightly greater than the maximum width of the vehicle;
   placing the vehicle between said lines aligned therewith so if it moves straight ahead the area between the lines define the area that will be traversed by the vehicle; and
   placing on said video monitor lines representing said extended left and right lines of said template.

* * * * *